United States Patent [19]

Suzuki

[11] 4,327,284

[45] Apr. 27, 1982

[54] FOCUSING DETECTION DEVICE

[75] Inventor: Toshitatsu Suzuki, Yokohama, Japan

[73] Assignee: Ricoh, Co., Ltd., Tokyo, Japan

[21] Appl. No.: 129,627

[22] Filed: Mar. 12, 1980

[30] Foreign Application Priority Data

Mar. 17, 1979 [JP] Japan .................................. 54/31290

[51] Int. Cl.³ .............................................. G01J 1/36
[52] U.S. Cl. ...................................... 250/204; 354/25
[58] Field of Search ............. 250/204, 201; 354/25 R; 356/4

[56] References Cited

U.S. PATENT DOCUMENTS 3,945,037  3/1976  Johnson .......................... 250/204 X Primary Examiner—David C. Nelms
Assistant Examiner—Darwin R. Hostetter
Attorney, Agent, or Firm—Burgess, Ryan and Wayne

[57] ABSTRACT

A focusing detection device is disclosed wherein an electric output obtained by sequentially driving a group of photoelectric elements disposed adjacent to one another on an imaging surface is sampled and held for part or the entirety of the output of a photoelectric converter, this held output is nonlinearized to be compared with a preceding held and nonlinearized output of part or the entirety of the output of the photoelectric converter, the compared value is sampled and held, and extreme values of the displacement of the focus of an image rendered to the photoelectric elements from this held output are derived.

3 Claims, 14 Drawing Figures

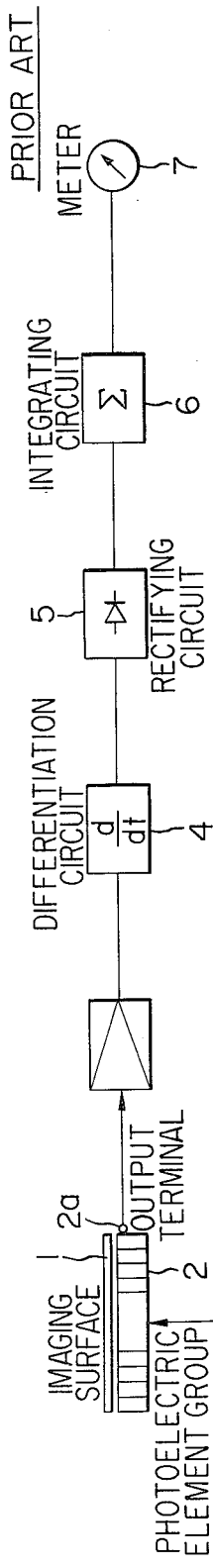
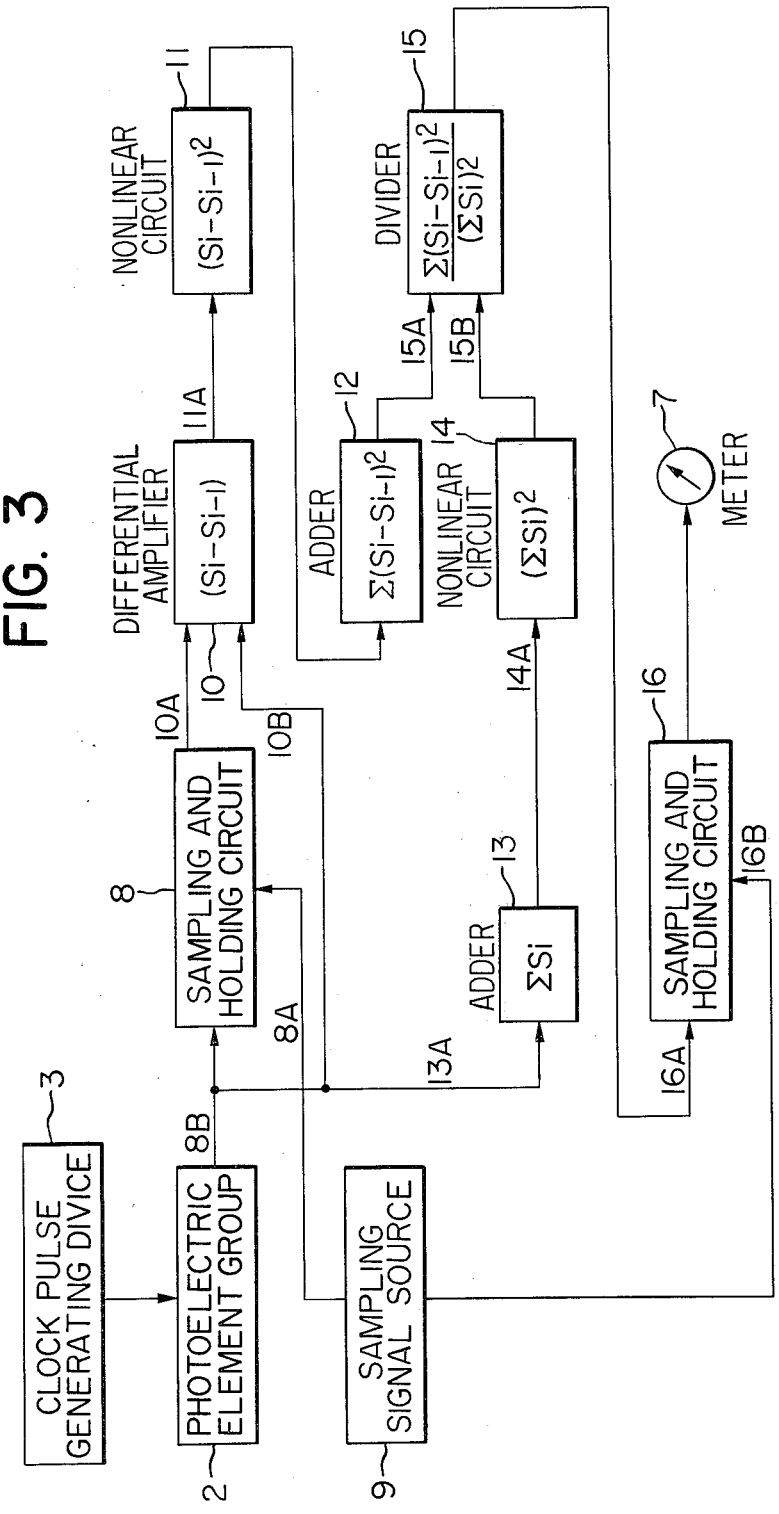

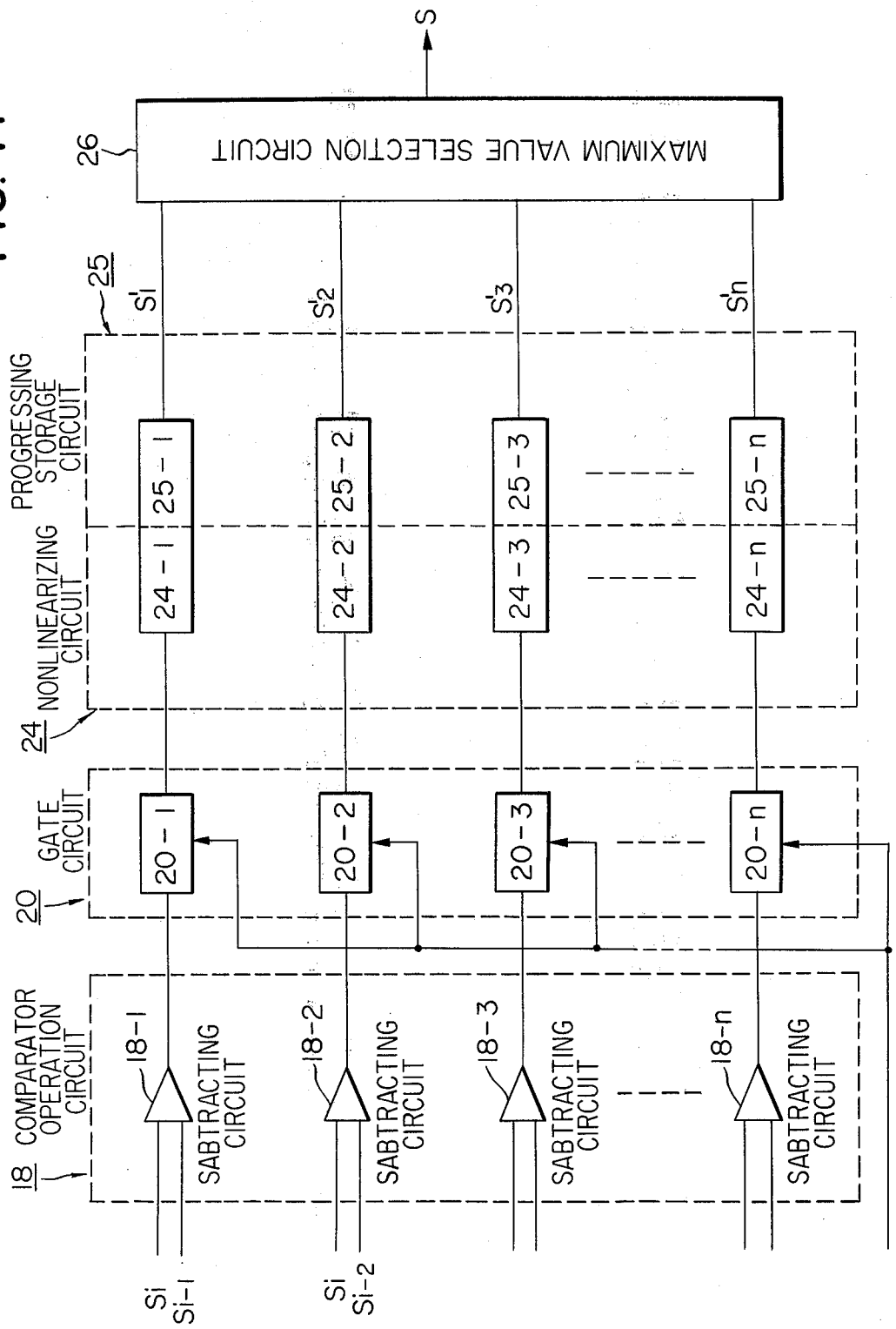

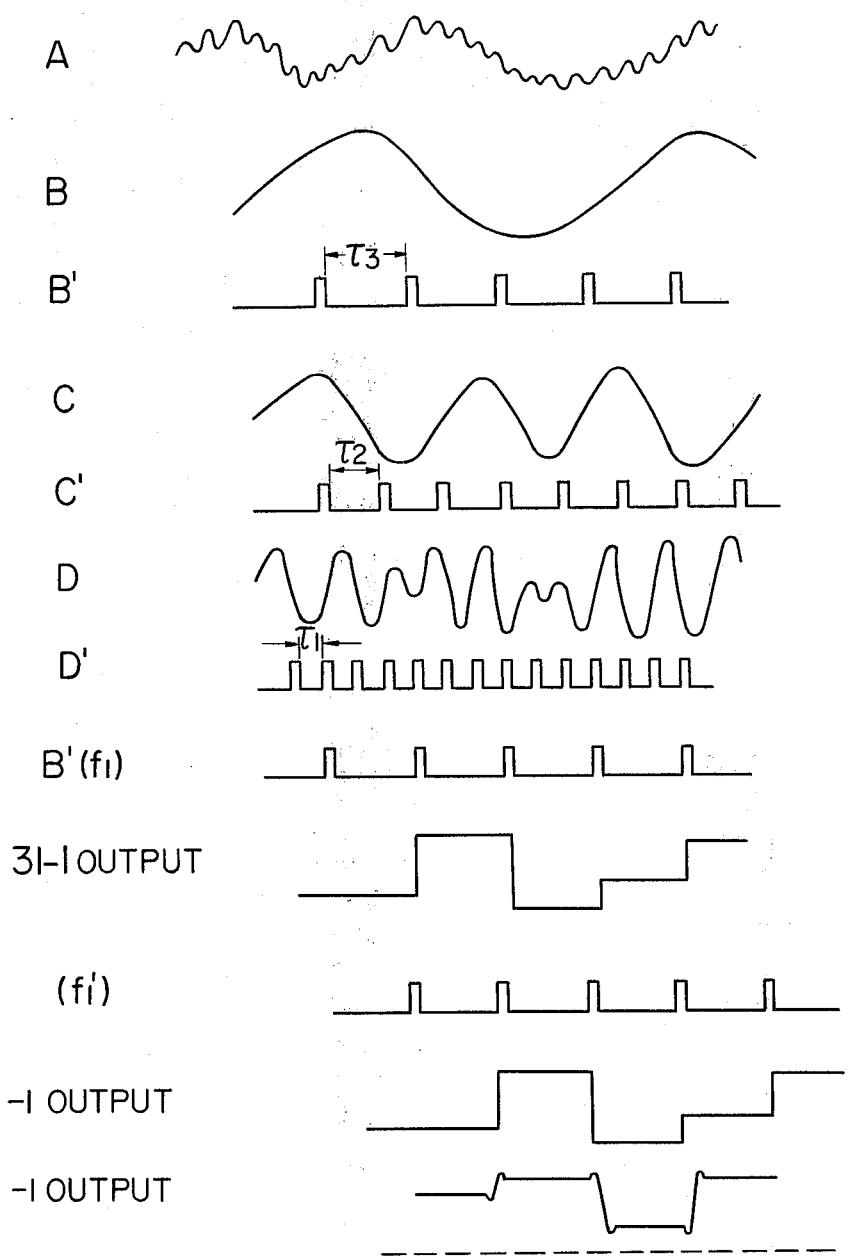

FOCUSING DETECTION DEVICE

BACKGROUND OF THE INVENTION

The present invention relates to a focusing detection device which uses circuits with unexceptional high frequency characteristics and yet is able to detect the optimum focusing position with improved accuracy.

A conventional focusing detection device is known wherein an array of photoelectric elements, such as photodiodes, are used which share a small light receiving area on the imaging surface of a lens (for example, the film surface of a camera) or an equivalent surface (a glass surface for focusing the viewfinder of a camera). In such a device, the photoelectric elements are sequentially driven by clock pulses from a clock pulse generating device so as to sequentially provide outputs according to the image. Since it is known that focusing is accomplished when the output from the photoelectric elements is maximized, this output is differentiated to obtain the maximum value of the output of the photoelectric elements. The differentiated output is rectified and the signal of the same symbol is integrated, and the integrated value is displayed on a meter. When the meter shows the maximum value, the optical system involved is in the position for optimum focusing.

In a conventional circuit as constructed above, a very high frequency component is included when the signal is built up. Thus, a circuit with good frequency characteristics, even in a higher range, is required as a signal processing circuit. Further, since the circuit for differentiating the output from the photoelectric elements and for obtaining the extreme values is performing analog processing, this device is defective in that, although the operation speed is fast, the accuracy is not too good.

SUMMARY OF THE INVENTION

Accordingly, the object of the present invention is to provide a focusing detection device which uses a circuit with unexceptional high frequency characteristics and yet is able to detect the optimum focusing position with improved accuracy.

The embodiments of the present invention will now be described with reference to the accompanying drawings.

BRIEF DESCRIPTION OF THE DRAWINGS

FIG. 1 is a block diagram of a conventional focusing detection device;

FIG. 3 is a block diagram of a first embodiment of the present invention;

FIG. 11 is a schematic block diagram of a seventh embodiment of the present invention;

FIG. 14 is a timing chart showing the operation of the device of FIG. 13.

DESCRIPTION OF THE PREFERRED EMBODIMENTS

Figure 2:
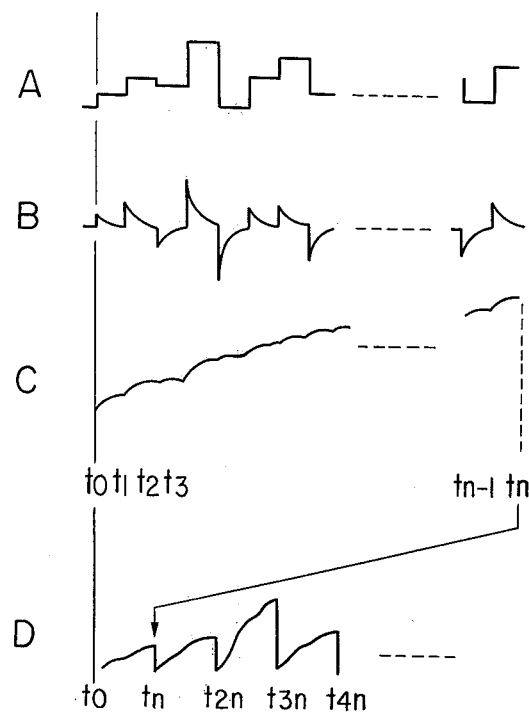
FIG. 2 is a view illustrating the operation of the device shown in FIG. 1.

Before describing the embodiments of the present invention, a conventional focusing detection device will be described. In FIG. 1 is shown a block diagram of a conventional focusing detection device. A group of photoelectric elements are disposed adjacent to one another on an imaging surface, such as a film surface of a camera or a glass surface for focusing, and this group 2 of photoelectric elements comprises an array of photodiodes or an array of charge coupling elements. This array 2 is sequentially driven by clock pulses from a clock pulse generating device 3. The output obtained corresponds to the magnitude of the image on an image forming surface 1. Since the focusing is optimum when the output from the group 2 of the photoelectric elements is at the maximum, the output from the group 2 of the photoelectric elements is amplified and is differentiated by a differentiation circuit 4.

For generating the voltage $V_i$ (i=1~h) for the respective photoelectric elements, the image on the imaging surface 1 requires a differentiation circuit 4 for selecting a function of the same polarity as the ratio of $V_{i+1}$ to $V_i$, since the amount of information $H_s$ possessed by the photoelectric element group 2 is $$H_s = \sum_{i=1}^{h} \log_2 V_{i+1}/ V_i$$

The outputs of the differentiation circuit 4 of the same symbol are aligned by a rectifying circuit 5, and they are operated on by a circuit 6 for obtaining the sum within the range of displacement of the optical system (not shown). The circuit 6 for obtaining the sum comprises, for example, an integrating circuit. After the sum is amplified, it drives a meter 7 as an extreme value detection circuit. The position of the optical system wherein the meter 7 shows the maximum value is the optimum focusing point. The voltage waveform of the output terminal 2a of the photoelectric elements 2 is shown in FIG. 2A. The output waveform of the differentiation circuit 4 is shown in FIG. 2B. As seen from FIG. 2B, when this circuit is used, the circuit must be constructed so as to include a very high frequency component at the build-up of the signal and it must have improved frequency characteristics. Further, since the waveform at $t_2n$ shown in FIG. 2D for obtaining the sum and its extreme values is the result of analog processing, although the operation speed is fast, its accuracy is not too good. Accordingly, this device has been defective in that an optimum focusing is not obtained.

Figure 4:
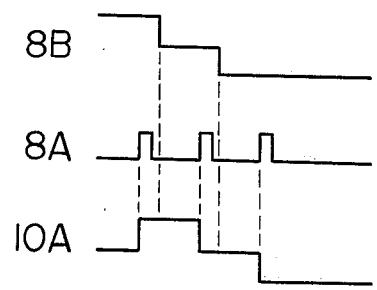
FIGS. 4 and 5 are views showing waveforms of the device shown in FIG. 3.
Figure 5:
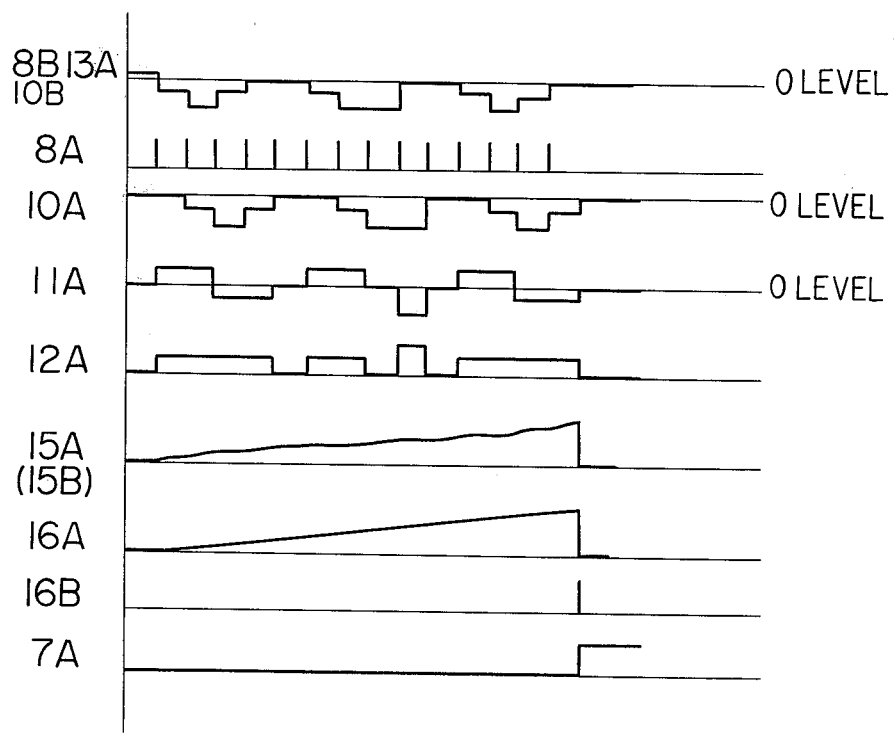

Next, the embodiments of the present invention will be described. FIG. 3 is a block diagram showing the construction of a first embodiment of the present invention, and FIGS. 4 and 5 show waveforms of the outputs of each part shown in FIG. 3. In FIG. 3, a sampling and holding circuit 8, in response to a sampling signal output 8A from a sampling signal source 9, samples and holds time serial image signals 8B from the photoelectric element group 2. In FIG. 4, it is preferable that the sampling signal 8A be applied slightly before the image signal 8B changes according to the clock pulses, so that the sequential relations of the time serial image signals 8B and the sampling signal output 8A may be shown. In FIG. 4, numeral 10A denotes the output of the sampling and holding circuit 8. The output 10A of the sampling and holding circuit 8 and the image signal 10B before sampling and holding (obviously equal to the image signal 8B) are used to operate the signal difference in a differential amplifier 10. In FIG. 5, when time scale of FIG. 4 is reduced, the waveform 11A of FIG. 5 is obtained as the output of the differential amplifier 10. The signal is then input to a nonlinear circuit 11. The nonlinear circuit 11 comprises, for example, an nth power circuit (where n is an even number), an absolute volume circuit, or other nonlinear function processing circuit so that the signal at its output is of a single polarity. In the example shown in FIG. 3, a second power circuit is used. The signal 8B (13A), before sampling and holding is summed by an adder 13 over part or the entirety of the group of photoelectric elements. A second nonlinear circuit 14 comprises a circuit similar to the nonlinear circuit 11, and it provides an output 15B when the output from the adder 13 is applied. The output 12A of the first nonlinear circuit 11 is applied to an adder 12, a summing as described above is performed, and an output 15A is obtained. The output 15A of the adder 12 and the output 15B of the second nonlinear circuit 14 are divided by a divider 15. And the output is sampled and held by a second sampling and holding circuit 16. The output from this circuit drives the meter 7 which shows the maximum value when the optical system involved is in the position for optimum focusing within the range of displacement of the optical image. The second sampling and holding circuit 16 may comprise a turnover value holding circuit. The reason why the output 15A of the time serial adder 12 is divided by the output 15B of the time serial adder 14 is to prevent variation in the peak value of the output level even when the light received from the object (the subject for photography) changes.

The focusing detection may be automated by applying the output of the sampling and holding circuit 16 to a servomotor so as to displace the optical system.

Thus, in accordance with the present invention, high frequency components such as differentiated outputs are not processed, and the focusing detection is easy with improved accuracy even while using a circuit with unexceptional high frequency characteristics, since the output signal difference of adjacent bits is obtained with a simple construction using a smapling and holding circuit and a differential amplifier is combination.

Figure 6:
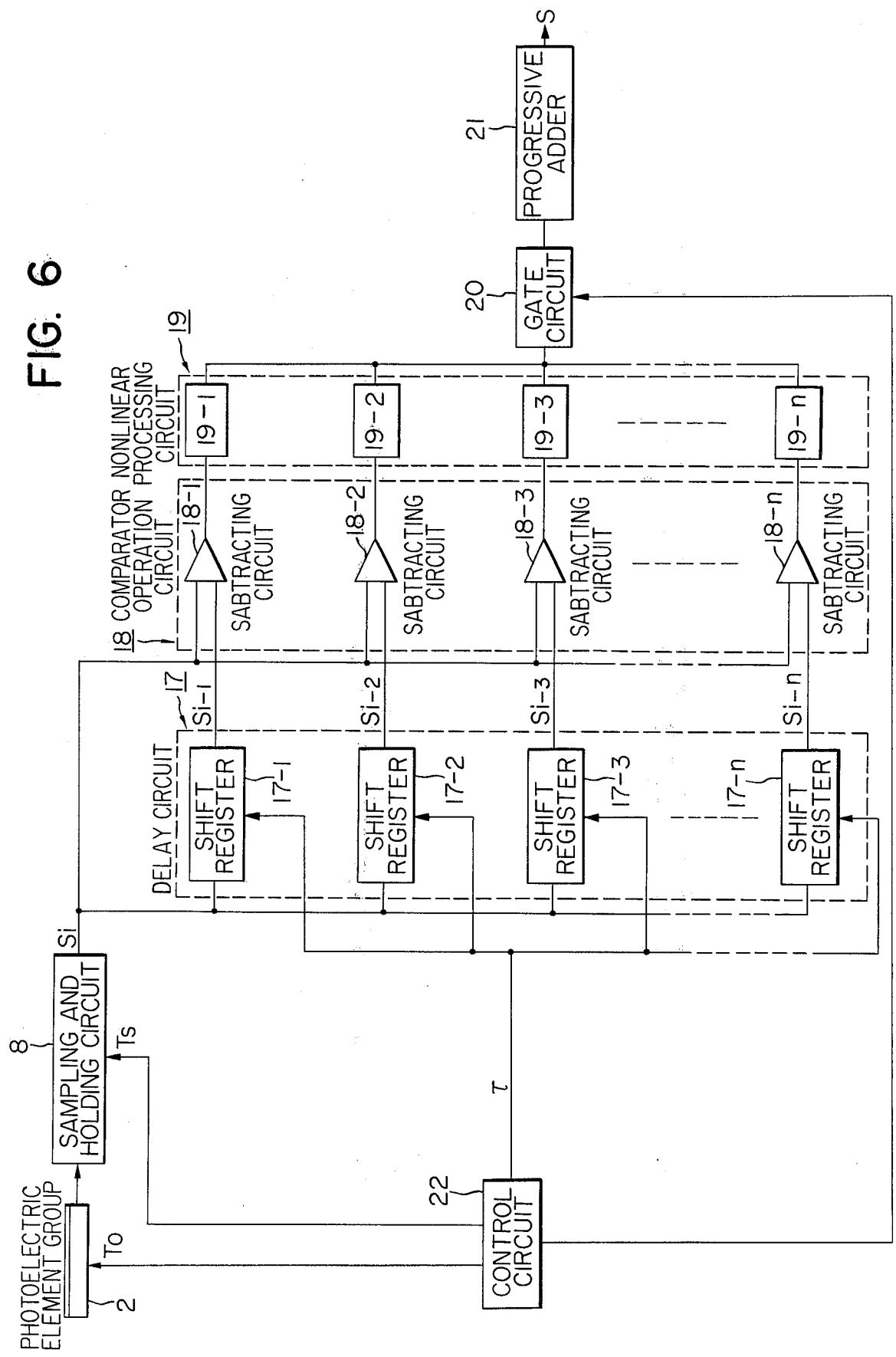
FIG. 6 is a schematic block diagram of a second embodiment of the present invention.
Figure 7:
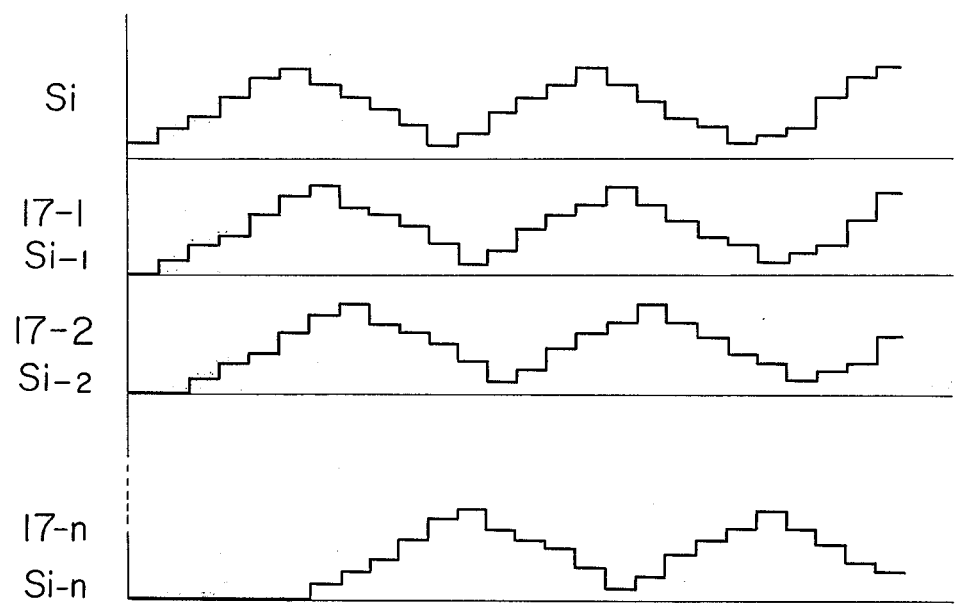
FIG. 7 is a timing chart showing the operation of the device shown in FIG. 6.

Next, a second embodiment of the present invention will be described with reference to FIGS. 6 and 7. In FIG. 6, numeral 2 denotes a group of photoelectric elements; numeral 8 denotes a sampling and holding circuit; and numeral 17 denotes a plurality of delay circuits as a whole. The delay circuits comprise analog shift registers (17−1), (17−2), (17−3), . . . (17−n): (17−1) is a one bit shift register, (17−2) is a two bit shift register, . . . (17−n) is an n bit shift register, and so on. Numeral 18 denotes a plurality of comparator operation circuits (18−1), (18−2), (18−3), . . . (18−n). In the figure, the output of the sampling and holding circuit 8 and the output of each delay circuit 17 are subtracted. Numeral 19 designates nonlinear processing circuits (19−1), (19−2), (19−3), . . . (19−n) which are n in number and which process each output of the subtracting circuits 18, also n in number. Numeral 20 denotes a gate circuit; 21, a progressive adder; and 22, a control circuit.

The timing pulse output $T_s$ from the control circuit 22 is applied to the sampling and holding circuit 8 for sampling and holding the output of the photoelectric elements 2 so as to obtain the signal $S_i$. The signal $S_i$ is shown in the timing chart in FIG. 5. This signal $S_i$ is branched: A portion of it is applied in parallel to the shift registers (17−1), (17−2), (17−3), . . . (17−n) of the delay circuits 17, and the other portion of it is applied in parallel to the subtracting circuits (18−1), (18−2), (18−3), . . . (18−n). In response to the shift pulse (its frequency is equal to that of the timing pulse $T_s$) generated by the control circuit 22, the singal is output after being shifted a predetermined number of times in the shift register 17, and is applied to the other terminal of the subtracting circuit 18. At one point, the signal $S_{i-1}$ is obtained from the photoelectric element group 2 one bit before the timing pulse in the shift register 17. In the shift register 17−2, the signal two bits before is obtained. Similarly, in the shift register 17−n, the signal $S_{in}$ which is n bits before the timing pulse is obtained. (Here i>n). These signals $S_{i1}, \ldots S_{in}$ are shown as compared with the signals $S_i$ in FIG. 5. The output of each subtracting circuit is $(S_i−S_{i-1})$, $(S_i−S_{i2})$, . . . $(S_i−S_{i-n})$. They may be expressed as $S_i−S_{i-k}$ where $i = n+1 \sim N$ and $k = 1 \sim n$. The output when the output of the subtracting circuit 18 is processed by the nonlinear circuit 19 may be generally expressed as $S_k$ ($k = 1 \sim n$). The output of each nonlinear circuit 19 is put through the gate circuit 20 and added by the progressive adder circuit 21; that is, the sum of the output signals corresponding to $i = n+1 \sim N$. From the supervision given by the control circuit 22, the gate circuit 20 is closed when $i = 1 \sim N$. This is to prevent erroneous operation of the operation processing due to the fact that the correct output is not provided from the shift register 17−n when $i = 1 \sim n$. When a series of the outputs of the photoelectric group 2 showing $i = 1 \sim N$ stops generating, the output S is obtained from the progressive adder circuit 21. For example, the particular space frequency of the photoelectric group 2 is $f_0 = 36$ lp/mm. This means that the sum obtained via the shift register 17−1, the subtracting circuit 18−1, and the nonlinear processing circuit 19−1 is at the maximum value with respect to the image of a space frequency of 36 lp/mm. Since the output of the nonlinear processing circuit 19−1 is F $(S_i−S_{i-2})$, this takes the form of signals of three bits whose intermediates one bit is taken away and processed. That is, it is to the same effect that the outputs from adjacent photoelectric elements of group 2 having the element space $p' = 2p$ are nonlinearly processed. Therefore, the particular space frequency is different from the above-described $F_0$, and is called a particular additive space frequency. When it is symbolized as $F_{02}$ $$F_{02} = \tfrac{1}{2}p' = \tfrac{1}{2} \times 2p = f_0/2 \qquad (3)$$

and $f_{02} = 18$ lp/mm. Similarly, the particular additive space frequencies $f_{02}, f_{04}, \ldots f_{0n}$ corresponding to the nonlinear processing circuits (5−3), (5−4), . . . (5−n) are respectively $f_0/3, f_0/4, \ldots f_0/n$. When $n = 6$, $f_{03} = 12$, $f_{04} = 9$, $f_{05} = 7.2$ and $f_{06} = 6$ lp/mm. Thus, even though an image of space frequency 6 36 lp/mm is formed on the light receiving surface of the photoelectric element 2 depending on the kind of subjects and the distance to the subject, a particular space frequency or a particular additive frequency which is very close to this space frequency is always prepared. The output S of the circuit 7 in a perfect focusing condition is sufficiently great so that the difference of the output due to the difference in space frequency of the image will not be generated much. The rate of change of the output S of the circuit is also sufficient so that it is substantially constant regardless of the changes in the difference in the space frequency.

The third embodiment of the present invention will now be described. It is constructed so that it is able to respond to lower space frequencies. For this, it is preferable to determine the particular additive space frequency in a geometrical series. Although this may be satisfied by making n of the shift register $(17-n)$ have a greater value, this is not preferable from the perspective of economy. The shift registers $(17-1)$ and $(17-2)$ are the shift registers of one and two bits, respectively. The corresponding particular additive space frequencies $f_{01}$ and $f_{02}$ are, respectively, $f_{01}=f_0$ and $f_{02}=f_0/2=f_{01}/2$, and their ratio is 2:1. When this relation is applied to further stages:

$$f_{03} = f_{02}/2 = f_0/2^2 \qquad (5)$$

$$f_{04} = f_{03}/2 = f_0/2^3$$

$$f_{0n} = f_{0(n-1)}/2 = f_0/2^{n-1}$$

This means the shifted amount of the shift register is doubled from one stage to another, and in general $(17-k)$ is formed of a shift register of two bits. When this is applied to the values of the second embodiment, the particular additive space frequencies are 36, 18, 9, 4.5, 2.25, and 1.125 lp/mm. That is, with the same number of stages, a wider corresponding range of particular additive space frequencies is obtained. For the shift register $(17-6)$, a register of 32 bits must be used.

Further, as a fourth embodiment of the present invention, analog delay line may be used instead of the shift register in the delay circuit 17. The delayed amount is preferably an integral multiple of the frequency of the timing pulse $T_0$ driving the photoelectric elements PSA.

Figure 9:
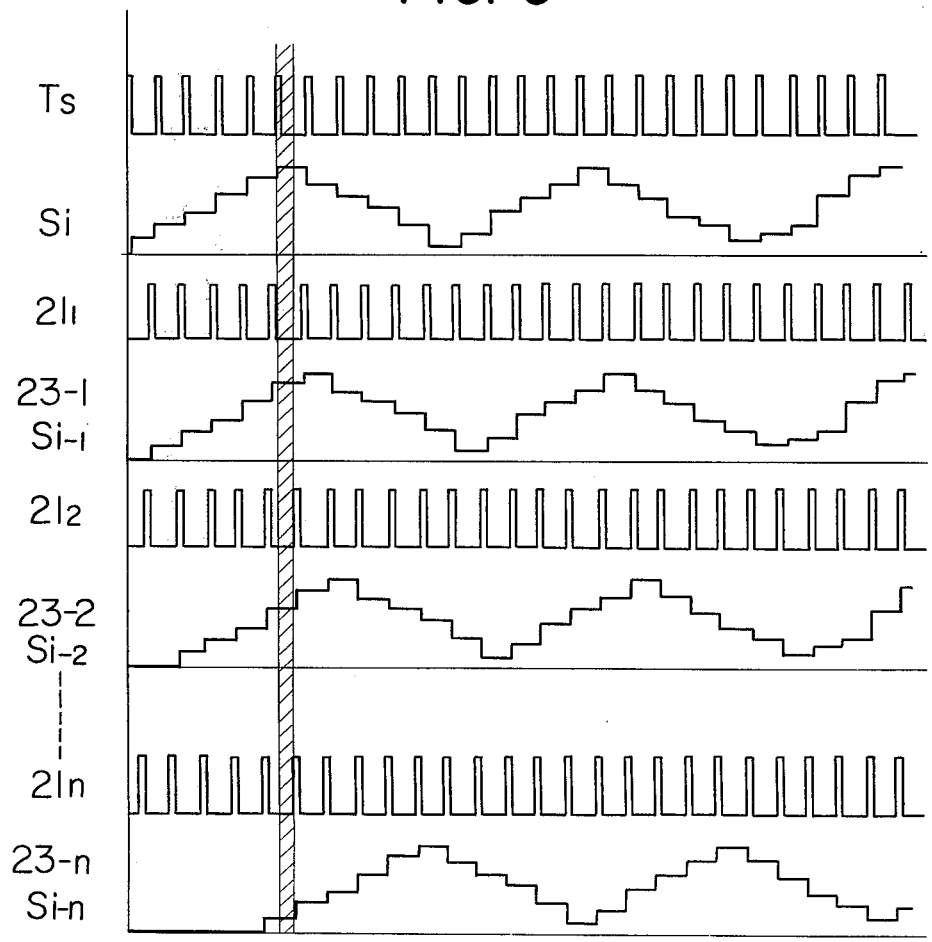
FIG. 9 is a timing chart of the device shown in FIG. 8.
Figure 8:
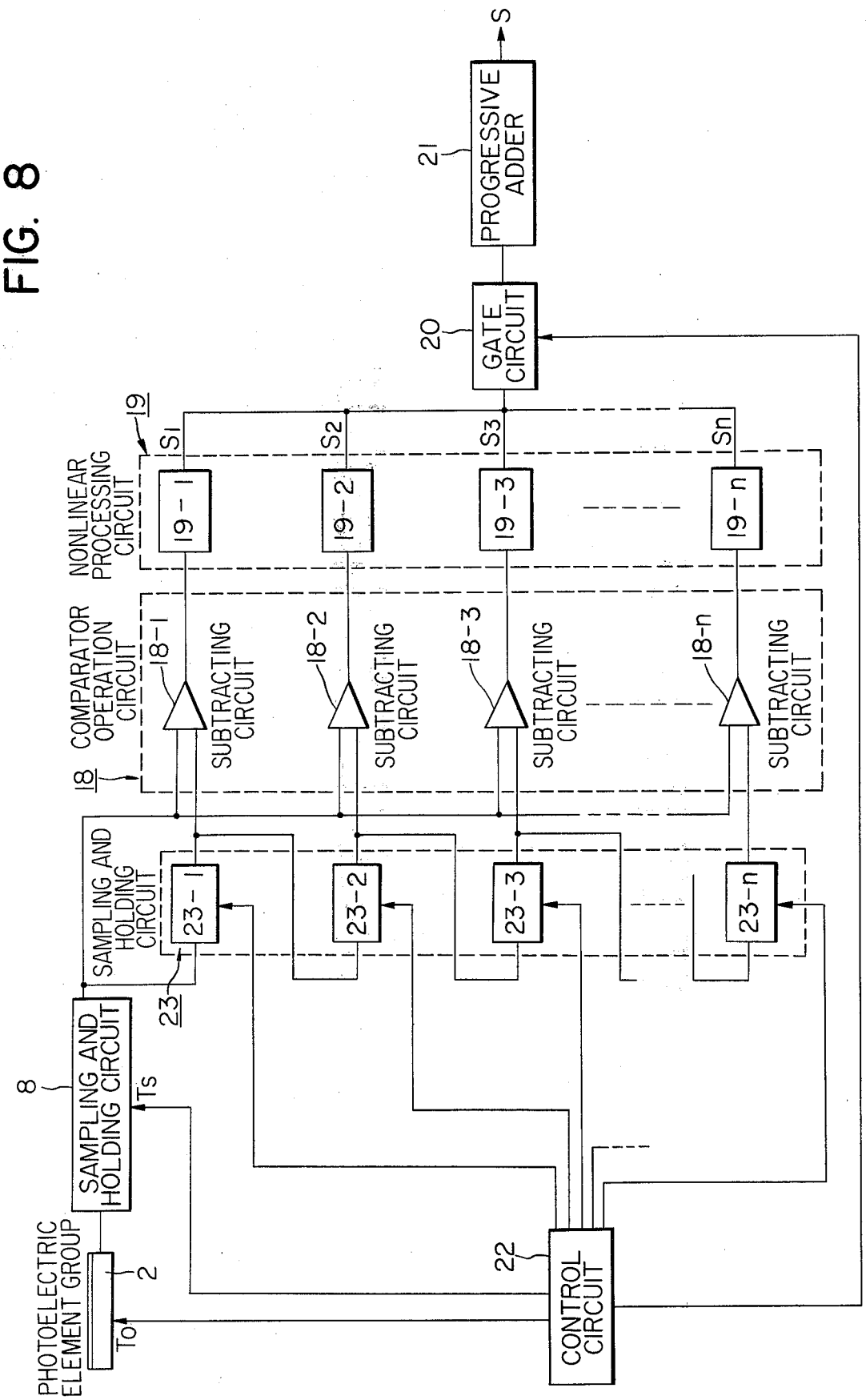
FIG. 8 is a schematic block diagram of a fifth embodiment of the present invention.

In the fifth embodiment of the present invention, a sampling circuit is used as a delay circuit, and its block diagram is shown in FIG. 9. In FIG. 8, the same numerals refer to similar parts as shown in FIG. 6. Numeral 23 denotes a second sampling and holding circuit and replaces the shift register 17 of FIG. 6 and comprises $(23-1), (23-2), \ldots (23-n)$. The output $S_i$ of the sampling and holding circuit 8 is input to only $(23-1)$ of the second sampling and holding circuit. The input of the sampling and holding circuit $(23-2)$ uses the output from the preceding stage $(23-1)$. That is, the second sampling and holding circuit 23 is connected in series with many stages. When timing pulses are applied to the second sampling and holding circuit 23 from a control circuit 22, they are applied slightly in advance in each stage compared to the preceding stage. Before switching is effected by a next timing pulse, the output signal from the immediately preceding stage of the sampling and holding circuit 23 effects the sampling and holding of the present stage. Thus constructed, the sampling and holding circuit 23 at any arbitrarily selected stage has a delay of one bit as compared to its immediately preceding stage. FIG. 9 shows an opertional timing chart of FIG. 8. In the period when $S_i$ and $S_{i-n}$ exist at the same time, that is, in the range marked off by the oblique lines, when the operations after the subtraction are performed, the same effects can be obtained as in shifting of n bits in a shift register. As the number n increases, the above-mentioned period narrows, and n cannot be made infinitely great.

Figure 10:
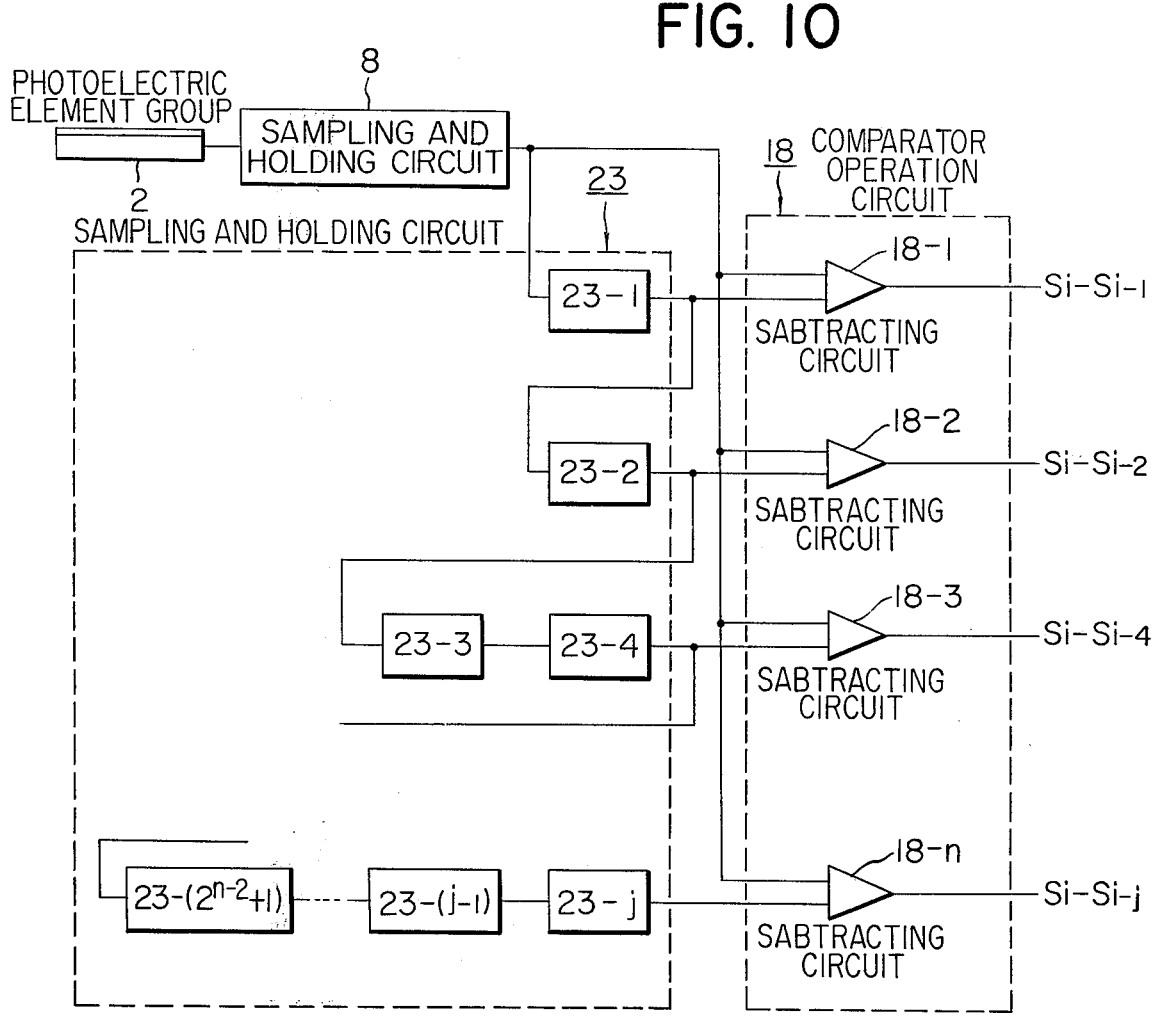
FIG. 10 is a schematic block diagram of a sixth embodiment of the present invention.

In the sixth embodiment of the present invention, the particular additive space frequencies are spaced apart in the form of a geometric series as in the cases of the embodiments 2 and 3. The block diagram of this embodiment is shown in FIG. 10. In this case, as a second sampling and holding circuit 23, there are circuits, j in number as defined by $j=2^{n-1}$ where the subtracting circuits 18 are n in number. To one of the terminals of the subtracting circuit $(18-k)$ is input the output $S_i$ of the sampling holding circuit 8, and to the other terminal is input the output of $(23-k')$ as determined by $k'=2^{k-1}$. The remaining outputs of the second sampling and holding circuit 23 are used for applying signals to the next stage of the sampling and holding circuit. Thus, the output from the subtracting circuit $(18-k)$ is $S_i-S_{i-2k-1}$, and the corresponding particular additive space frequency is $$f_{0k}=f_0/2^{k-1} \qquad (6)$$

Figure 12:
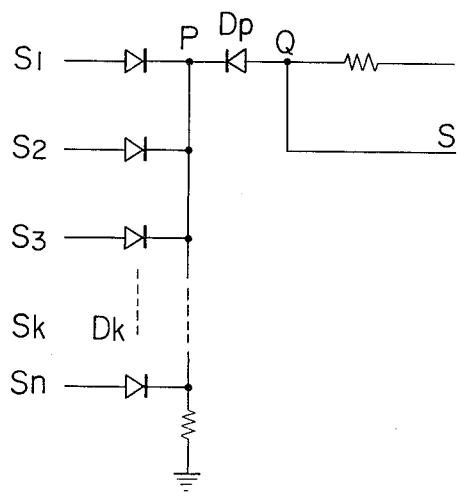
FIG. 12 is a circuit diagram of the maximum value selecting circuit used in the device of FIG. 11.

Next the progressibe adding circuit 21 will be described. After being processed in many stages, the output of the photoelectric elements 2 is summed in the progressive adding circuit 21. However, since there is a saturation value in the progressive adding circuit 21, it cannot respond to big changes of the output S of the circuit as the sum draws near to the saturation value. In order to compensate for this problem, the nonlinearized result $S_k$ of each output must be made sufficiently small. When this is actually done, S/N is degraded in the further progressive processing procedure of $S_k$, thereby degrading the focusing detecting accuracy. In the seventh embodiment of the present invention, shown in FIG. 11, this problem is solved. In the block diagram shown in FIG. 11, signals $S_i$, $S_{i-1} \ldots S_{i-n}$ and the subtracting circuit 18 are similar as those shown in FIGS. 6, 8 and 10, and they operate in a similar manner. $(20-1), (20-2), \ldots (20-n)$ are gate circuits, and they are simultaneously controlled by the same control signal as in the case of the gate circuit 20 shown in FIG. 6. $(24-1), (24-2), \ldots (24-n)$ are added to a nonlinearizing circuit 19 and incorporate a progressive storage circuit 25. Numeral 26 denotes a maximum value selection circuit. The nonlinearizing circuit 24, even after the necessary processing of the output of the subtracting circuit 18, does not output the result immediately, but stores it in the progressive storage circuit 25 temporarily. When all of the signals from the photoelectric element group 2 are processed, respective progressive sums $S'_1 \sim S'_n$ are output. The maximum value selecting circuit 26 selects the maximum value within these sums $S'_1 \sim S'_n$ and output an output S of the circuit. Since the summing process is not performed in the signal processing procedure, the circuit output S rarely reaches the saturation value. Thus, the change in the circuit output S before and after focusing can be sufficiently secured. A parallel diode circuit shown in FIG. 12 is used as the maximum value selection circuit 26. In FIG. 12, among the inputs $S_1 \sim S_n$, the maximum input $S_k$ determines the potential at the point P through the diode $D_k$. Since reverse voltage is applied to all of the other diodes, inputs other than $S_k$ do not render any effect. The maximum input $S_k$ through the diode $D_k$ generates a particular potential drop. By connecting a reverse diode $D_p$ from the point P to the point Q, this potential drop can be compensated. Thus, the potential of the output S from the point Q is the same potential produced by the maximum value $S_k$ of the input signals.

In the above description, a comparator circuit was used as a subtracting circuit for comparing the output of the delay circuit with the time serial signal from the photoelectric element group. However, since the original purpose of using this circuit is to compare the values of the two signals, it is also possible to obtain the ratio of the two signals. When the two signals are $S_i$ and $S_{i-1}$, the ratio signal is $S_i/S_{i-1}$. The absolute value of the logarithm obtained in the nonlinearing processing circuit in the next stage is $$\left| \log \frac{S_i}{S_{i-1}} \right| \tag{7}$$

A subtracting circuit may be used as a comparing circuit for obtaining the result as defined in (7) if sampling and logarithmic compression amplification are effected by the sampling and holding circuit 8 and if the absolute value is obtained in the next nonlinearizing circuit 19 or 24.

Although the above description has been made with respect to the analog processing, this invention can also be applied to the digital processing if at some point an analog-to-digital conversion is effected. Further, although the operation in the comparator circuit is based on $S_i$, operations such as $S_{i-k}$ and $S_{i-n}$ may also be effected if $S_{i-n}$ is taken as a reference. Thus, the reference signal in the comparing operation can be selected arbitrarily from $S_i$ to $S_{i-n}$.

Accordingly in accordance with the present invention, a substantially constant output signal can be derived under the optimum focusing condition. This is since the device in accordance with the present invention can be treated in the same manner as a device with a plurality of particular space frequencies by selecting an arbitrarily selected number of signals for further signal processing in processing the output signal from the photoelectric element group. Thus, undesirable variation in the focusing accuracy will not be caused regardless of the kind of subjects or the distance to the subject.

Figure 13:
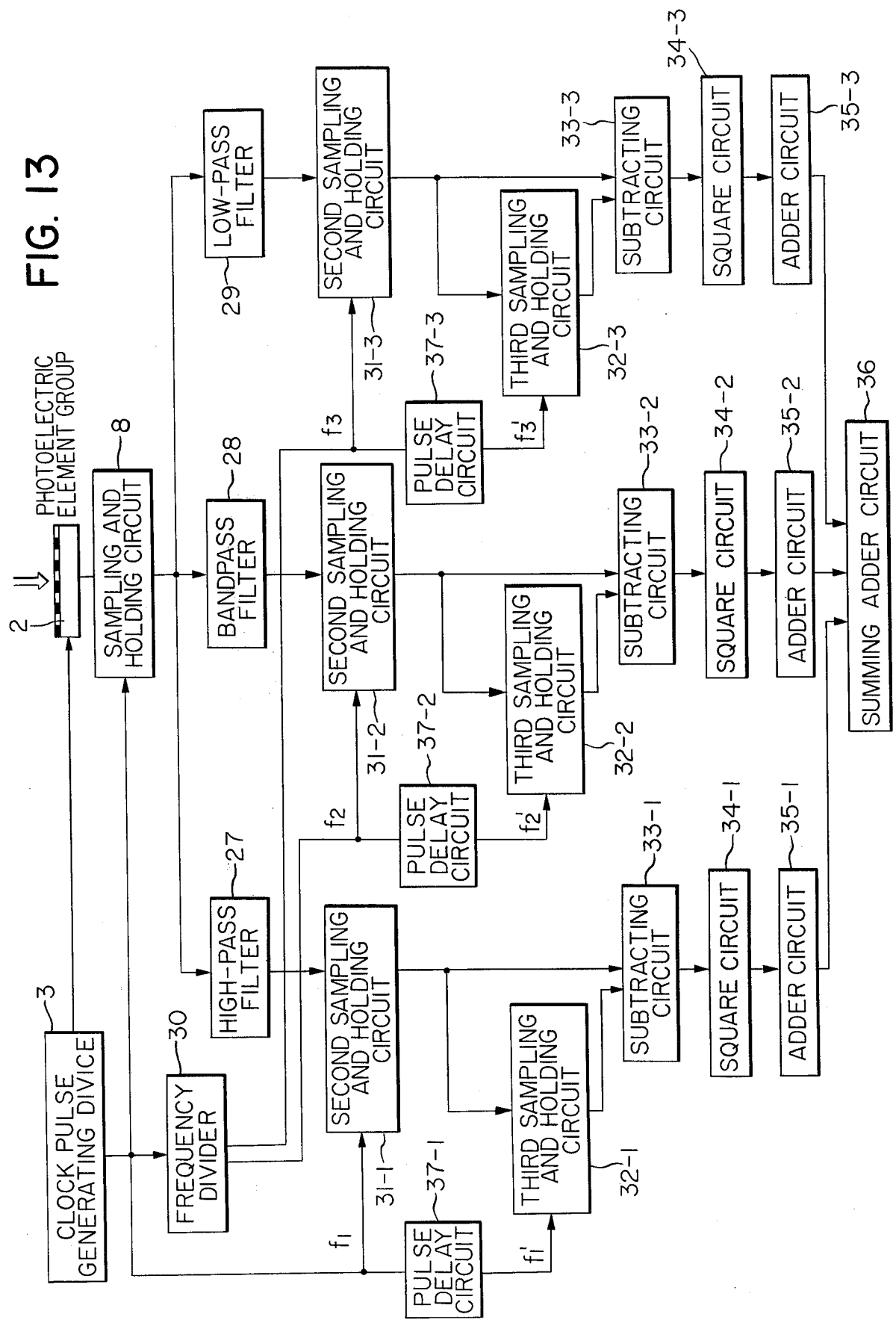
FIG. 13 is a schematic block diagram of the first embodiment of the present invention.

Next, the eighth embodiment of the present invention will be described with reference to FIG. 13. In this embodiment, the focusing detection accuracy can be kept to the optimum condition regardless of the kind of the subjects or the distance to the subject by processing the output signal of the photoelectric element group. Numeral 2 denotes the photoelectric element group; 3, the clock pulse generating circuit; and 8, the first sampling and holding circuit. Numeral 27 denotes a high-pass filter; 28, a bandpass filter; 29, a low-pass filter; 30, a frequency divider; 31−1, 31−2 and 31−3, second sampling and holding circuits; 32−1, 32−2 and 32−3, third sampling and holding circuits; 33−1, 33−2 and 33−3, subtracting circuits; 34−1, 34−2 and 34−3, square circuit; 35−1, 35−2 and 35−3, adder circuit; 36, a summing adder circuit; and 37−1, 37−2 and 37−3, pulse delay circuits.

The photoelectric element group 2 disposed in the vicinity of the focal plane of an optical system are driven by a pulse from the clock pulse generating device 3. An image signal is then sequentially output from one of their terminal. In order to obtain a sampling pulse from the output of the pulse generator 3 and to apply it to the first sampling and holding circuit 8, this sequential image signal is sampled and held. The image signal as shown at A of FIG. 14 is then obtained after removing the clock signal component. This image signal is frequency divided by the three filters 27, 28 and 29. The output of the low-pass filter 29 is a signal of a frequency component with a relatively low space frequency among the image signals. The output of the high-pass filter 27 is a signal of a frequency component with a relatively high space frequency. The output of the bandpass filter 28 is a signal of a frequency component with an intermediate space frequency. The frequency of the sampling pulse is divided by the frequency divider 30 so as to obtain the pulse row $f_2-f_3$. $f_1$ shown at D′ of FIG. 14 is a pulse row of the first sampling and holding circuit 8, that is the pulse of the second sampling and holding circuit 31−1. The delayed amount of the delay circuit 37−1 is selected to be an adjacent pulse time $\tau_i$, 37−2 is selected to be a time space $\tau_2$ at $f_2$ amd 37−3 is selected to be $\tau_3$ at $f_3$. When the space frequency is low, the time is selected to be $\tau_3$ which is longer and when it is high, the time is selected to be $\tau_1$ which is shorter. The filtered outputs are shown at B, C and D of FIG. 14. The pulses $f_1'$, $f_2'$ and $f_3'$ delayed through a delay circuit are applied to the third sampling and holding circuit and the pulse row $f_1$, $f_2$ and $f_3$ that are not delayed are applied to the second sampling and holding circuit. As a result, in the subtracting circuit 33−1 and so on, the difference in the outputs of the second and third sampling and holding circuits is obtained. The differences in the sequential image signals are obtained for the periods between $\tau_1$, $\tau_2$ and $\tau_3$. These outputs are nonlinearized by the second power circuit 34−1 and so on and then are sequentially added so as to obtain signals L, P, and F. Each signal is maximized when the focal point is on the photoelectric elment group 2, that is, when the amount of information is maximized. Each signal is added by the summing adder circuit 36. When the output of this adder circuit is maximized, the focal point is on the photoelectric element group.

Instead of the summing adder circuit 36, it is possible to detect by a maximum value detection circuit a signal showing the maximum value among the signals L, P and F each of which maximized in a focused condition and to detect the time when the signal is maximized so as to show the optical system is in the optimum focusing condition.

Thus, it is possible to effect the signal processing independently of space frequency by linearly processing and sequentially adding the derived difference signal since the period for sequentially adding the image signal is changed in accordance with the difference in the space frequency contained in the subject.

Accordingly, since it is possible to process the signals independently of the space frequency, it is possible to maintain the improved accuracy in detecting the optimum focusing independently of the kind of the subjects and the distance to the subject.

What is claimed is:

1. A focusing detection device characterized in that it comprises a group of photoelectric elements which share a small light receiveing area in an imaging surface or in a surface optically equivalent thereto and which are disposed adjacent to one another; an electrically driving device for sequentially obtaining an output from one of the terminals of the photoelectric element group; a circuit for sampling and holding an output from said one terminal; a device for obtaining the difference between the output of the photoelectric element group and the output of the photoelectric element before the sampling and holding is effected; a circuit for nonlinearizing the output of the device for obtaining the difference; a device for summing the output of this circuit over part or the entirety of the photoelectric element; and a device for obtaining extreme values within the range of the displacement of an optical image rendered to the photoelectric elements corresponding to the summed value.

2. A focusing detection device as claimed in claim 1 further characterized in that the summed output derived by the device for summing the output after the nonlinearizing processing over part of the entirety of the photoelectric elements is divided by the nonlinearized output of the sum of the outputs of the photoelectric elements before the sampling and holding, and thereafter, the extreme values within the range of the displacement of the optical image are obtained.

3. A focusing detection device as claimed in claim 1 or 2 further characterized in that the output of the photoelectric output is analog-to-digital converted before summing and then is added by a digit signal.

* * * * *